(No Model.)
M. WELSH.
FRUIT SLICER.
No. 577,275. Patented Feb. 16, 1897.
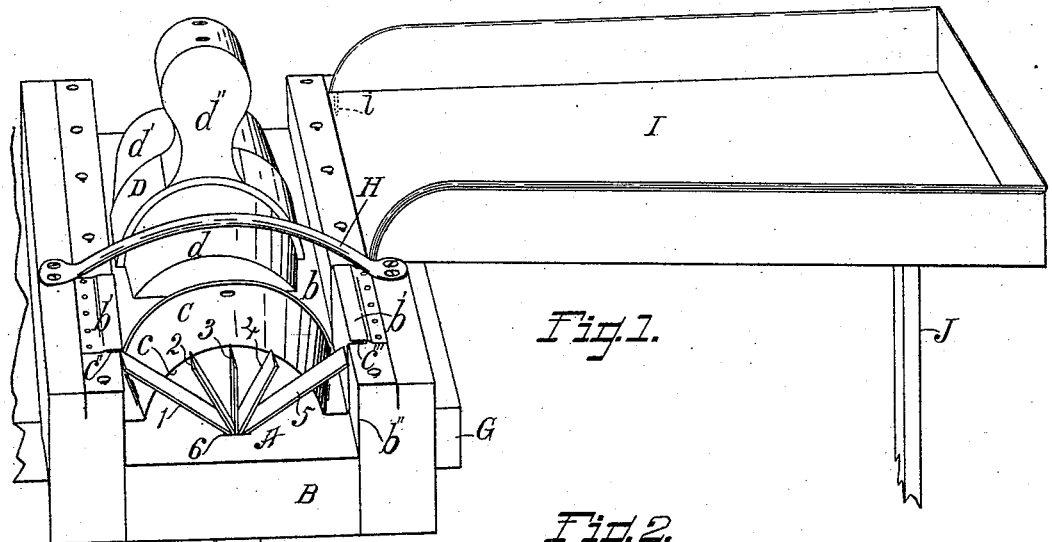
Fig. 1.
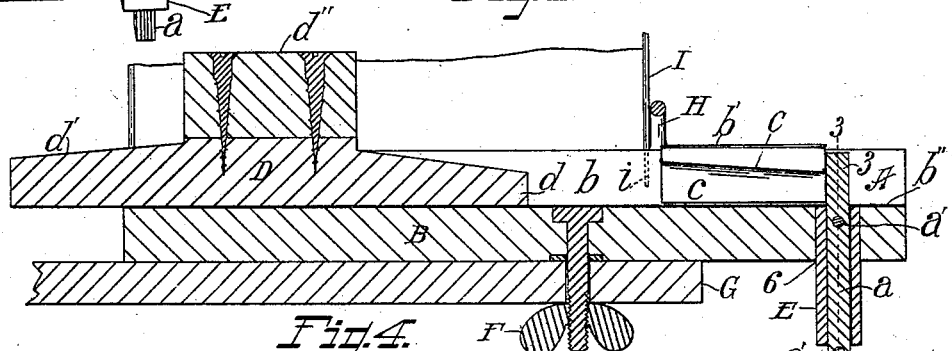
Fig. 2.
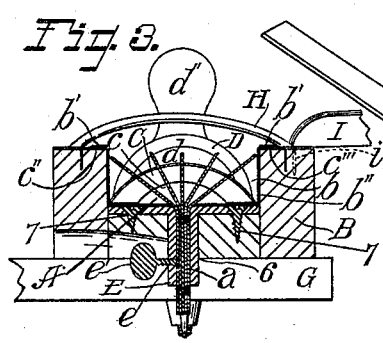
Fig. 3.
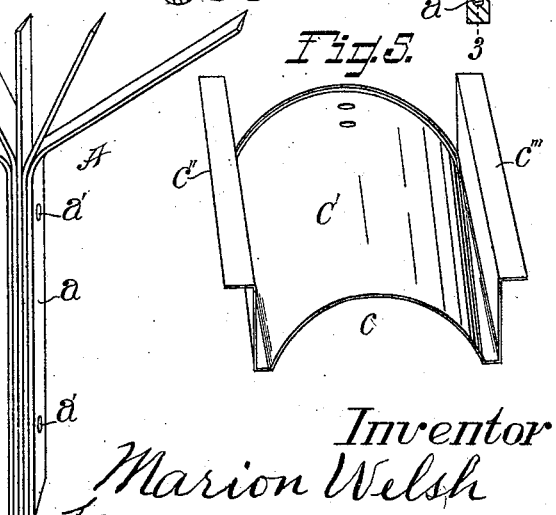
Fig. 4.
Fig. 5.
Witnesses
Perry Lingman
Alfred J. Townsend
Inventor
Marion Welsh
by Hazard & Townsend
his attys
THE NORRIS PETERS CO., PHOTO-LITHO., WASHINGTON, D. C.

UNITED STATES PATENT OFFICE.

MARION WELSH, OF LOS ANGELES, CALIFORNIA.

FRUIT-SLICER.

SPECIFICATION forming part of Letters Patent No. 577,275, dated February 16, 1897.

Application filed September 9, 1896. Serial No. 605,317. (No model.)

*To all whom it may concern:*

Be it known that I, MARION WELSH, a citizen of the United States, residing at Los Angeles, in the county of Los Angeles and State of California, have invented a new and useful Fruit-Slicer, of which the following is a specification.

This invention comprises an appliance for slicing pieces of fruit which are virtually semicircular in cross-section—such, for instance, as the halves of peaches, apricots, pears, apples, &c.

An object of this invention is to slice the fruit into uniform crescent-shaped segments, the cut faces of which will be straight and smooth and will not show any ragged edges, the advantages thus to be obtained being that the fruit is more attractive and more tempting to the eye of the purchaser and brings a higher price than could otherwise be obtained.

Another object is to perform the work more rapidly and economically; also, to provide for convenient cleaning and sharpening of the knives, and also to make provision for easily changing the machine for splitting larger or smaller fruit.

A further object is provide an appliance which will slice the fruit as above specified, but which is very simple in structure and is easy to operate and is very cheap and portable and can be operated by hand. It is found in practice that one person with one of these machines can slice perfectly smooth with great uniformity as large a quantity of fruit in a given time as can be sliced by hand by ten persons in the same time, and the fruit cannot be cut into such smooth and uniform slices by hand without the greatest care and skill.

This invention is adapted for operation by hand or other power, as may be desired, but hand-power is ordinarily preferable for the reason that the hand-machine is readily portable and can be moved to different parts of the factory where the work is required to be done, while if machine-power is used to drive the plunger the fruit must be carried to the place where such machine-power is available.

The accompanying drawings illustrate the invention.

Figure 1 is a fragmental perspective view of the slicer with feed-tray fastened to a table. This view is taken from the rear of the slicer—that is, the side opposite to that at which the operator will ordinarily stand. It is usually preferable to operate the plunger with the right hand, but the plunger can be operated with either hand, at the pleasure of the operator. Fig. 2 is a vertical longitudinal mid-section of the slicer fastened to a table. Fig. 3 is a cross-section of the slicer on line 3 3, Fig. 2. Fig. 4 is a perspective view of the knife detached. Fig. 5 is a perspective view of a fruit-guard of larger size than that shown in Fig. 1, the same being designed to be used for the halves of the larger sizes of fruit.

This invention comprises a fruit-slicer having radiating cutting-blades in combination with a guideway which is virtually semicircular in cross-section and is adapted to prevent the fruit from expanding laterally when under endwise pressure, and which is arranged with its flat portion slightly above the radial center of the blades, and a plunger to force fruit-halves through the guideway.

I am aware that radiating blades have been heretofore used in fruit-slicers, but my invention differs from all previous machines in that I provide a semicircular guideway which is adapted to prevent soft fruit-halves, such as the halves of peaches from which the pits have been removed, from expanding laterally when under endwise pressure.

I am aware that guide springs or fingers have been circularly arranged in combination with blades radiating from a common center and a plunger for forcing the fruit through the circular guideway thus formed and against such blades, but such a construction will not serve the purposes of this invention, because the fruit which I operate upon cannot be cut by such a machine into the uniform, even, and smooth slices into which it can be cut with the machine provided with the guideway, which prevents the lateral expansion of the fruit.

In order to fully accomplish the purposes of my invention, that is, to neatly and rapidly slice fruit-halves, such as the halves of peaches, apricots, &c., from which the pits have been removed, I propose to condense the said fruit-halves and deliver them to radial cutting-blades while thus condensed, and in this way I secure better results, the fruit being cut more smoothly and presenting a better appearance than I have been able to secure by any other means. I entirely avoid the ragged edges and wavy and irregular pieces produced when the fruit is cut by machinery without this condensation.

My invention includes a fruit-slicer comprising a series of radial blades substantially covering a semicircle, a fruit-compressing guideway, the floor of which is approximately in a plane with the chord of such semicircle of radial knives and the top of which guideway is in form a segment of the frustum of a cone, being a tapering arch tapering toward the blade to deliver the fruit-halves to the blades in a compressed condition, and a plunger to force the fruit-halves through the tapering guideway. The top and floor of the guideway are continuous from side to side and from end to end thereof and are devoid of openings, so that the fruit will not squeeze out laterally or be in any way broken or distorted from a semicircular form by the operation of delivering it to the knives. This tapering guide delivers the fruit to the knives in a compact semicircular form, and by this means the satisfactory work above referred to is made possible.

The radiate cutting-blades can be of any suitable form and of greater or of less number, as desired. In the drawings I have shown a form which I consider preferable. In this form the knife A is composed of metal strips bent at varying angles and fastened together to form a straight shank $a$ and radiating blades 1, 2, 3, 4, and 5, so that it will cut a fruit-half into six approximately equal segments. $a'$ indicates rivets which fasten the shank portions of the strips together.

This fruit-slicer comprises a guide for the fruit-halves with guideway semicircular in cross-section, a plunger to force fruit-halves through the guideway, and radial blades arranged in the path of the fruit.

B is the base member of the slicer, having a slideway $b$ for the fruit.

C is a guard with guideway $c$ for the fruit-halves semicircular in cross-section and facing the floor of the slideway $b$.

D indicates a plunger for forcing the fruit-halves through the guideway. The guideway $c$ in the guard is tapering from the rear toward the front, so that a fruit-half which will easily enter the rear end of the guideway $c$ will be compressed to a greater or less degree when it passes from the outlet end of the guideway, thus to make it firm while it is being cut by the radial blades. The base member B has a channel to form the slideway $b$ for the fruit-halves, and the guard is seated in the channel and is provided with wings $c''$ $c'''$ to enter suitable guard-retainers $b'$ on the side wall of the base member. The fruit-guard is for convenience made of sheet metal and is bent to form the tapering guideway.

The fruit-guard may be of any suitable size, and I find in practice that it is desirable to provide each slicer with two guards of different sizes, such as C C', the smaller size being used for the smaller fruits, while the larger size is used for the larger fruits, it being desirable to avoid compressing the fruit too much, but yet necessary to deliver it to the knives in such manner and condition that it will be cut evenly, and this is best accomplished when the fruit is slightly compressed when it engages the blades. The plunger D is duplex, the end $d$ being adapted to work with the guard C, while the other end $d'$ is adapted to work with the guard C'. When cutting small fruit, the smaller guard C will be used by the operator, who, in using the plunger, will insert the end $d$ into the guide $c$. When larger-sized fruits are to be sliced, the operator will slip the guard C out of the retainers $b'$ and replace it with the larger-sized guard C' and will reverse the plunger D, so as to use the end $d'$ to push the fruit through the guard. The base member B has a hole 6 therethrough and the metal-shank socket-piece E is provided with a screw-threaded hole $e$ therethrough for a set-screw $e'$, and is inserted through the hole 6 in the base member and is fastened to the base member by screws 7, thus to make a firm socket into which the straight shank $a$ of the knife may be inserted and held. The shank $a$ is seated in this socket and is wholly below the floor of the runway $b$ of the base B, so that it does not offer any obstruction to the segments of sliced fruit.

F indicates a clamp-screw for clamping the base B to the table, which is marked G in the drawings. The channel in the base B is preferably covered with a non-corrodible sheet of metal $b''$, which is securely fastened to the base member.

H indicates a stop for the plunger. This is set at such a point in the path of a portion of the plunger as to stop the plunger before it strikes either the guard or the knives. This enables the operator to do the work much more rapidly than where the stop is not used. The stop is preferably a metal loop or bail, as at H, fixed to the base B of the machine and extending across above the channel $b$ in the path of the handle $d''$ of the plunger D at such a point that it will intercept the handle when the plunger has almost but not quite reached the knives and the guard.

I indicates a feed-tray arranged at one side of the body of the machine and opening into the channel at a portion not occupied by the guard.

$i$ $i$ indicate pins at the front edge of the tray for insertion into sockets in the base member.

J indicates a support for the outer edge of the feed-tray.

In practical operation the base member B is fastened to the table and the operator will place the fruit-halves (which in the case of peaches or other fruit having stones will first be freed from the pit) on the tray. Then with one hand he will slide the fruit-halves one by one into the channel which forms the slideway b, flat side down; and each time a fruit-half enters the slideway the operator will push the plunger forward, thus pushing the fruit-half through the channel c of the guard until the plunger is intercepted by the stop H. Then the plunger is drawn back, another fruit-half is placed in position, and the plunger is again pushed forward. Each fruit-half as it passes from the guard pushes forward the fruit-half immediately preceding it, and thus ejects the fruit-slices from the machine.

Now, having described my invention, what I claim as new, and desire to secure by Letters Patent, is—

1. A fruit-slicer comprising a series of radial blades substantially covering a semicircle; a fruit-compressing guideway, the floor of which is approximately in a plane with the chord of such semicircle and the top of which guideway forms a tapering arch tapering toward the blades, to deliver the fruit-halves to the blades in a compressed condition; and the plunger to force the fruit-halves through the guideway.

2. The combination of the base member having a channel to form a slideway for fruit-halves; a guard seated in the slideway to form the top of a fruit-compressing guideway, the inner fruit-engaging face of which guard forms a tapering arch and is continuous from side to side of the channel and tapers toward the discharging end thereof; a plunger for forcing fruit-halves through between the guard and floor of the channel; and radiating blades at the discharging end of the guard.

3. A fruit-slicer comprising a fruit-half guideway semicircular in cross-section, and adapted to prevent the fruit-halves from expanding laterally when under endwise pressure; a plunger to force fruit-halves through the guideway; and radial blades in the path of the fruit.

4. The combination of a base member having a slideway for the fruit; a guard with fruit-half guideway semicircular in cross-section; and adapted to prevent the fruit from expanding laterally when under endwise pressure; a plunger for forcing fruit-halves through the guideway; and radial blades in the path of the fruit.

5. The combination of the base member having a channel to form a slideway for fruit-halves; a guard seated in the slideway and provided with a tapering fruit-half guideway, semicircular in cross-section facing the floor of the channel; and adapted to prevent the fruit-halves from expanding laterally when under endwise pressure; a plunger for forcing fruit-halves through the guideway; and radiating blades in the path of the fruit.

6. The combination of a base member having a channel to form a slideway for fruit-halves; a guard seated in the channel and provided with a tapering guideway for fruit-halves, semicircular in cross-section facing the floor of the channel; a plunger for forcing fruit-halves through the guideway; a hole being provided through the base member at the mid-line thereof at the end of the guideway; and a knife having a stock inserted in the said hole, and radial blades in the path of the fruit.

7. The combination of the base member having a channel, a socket for a knife-shank and side sockets for a fruit-guard; a sheet-metal fruit-guard having wings to enter said guard-sockets and bent to form a tapering guideway semicircular in cross-section to face toward the floor of the channel; and a knife having a shank inserted in said socket, and blades radiating from said shank and extending across the outlet of the guideway; and a plunger for forcing fruit-halves through the guideway.

MARION WELSH.

Witnesses:
JAMES R. TOWNSEND,
MARY H. SHEEKS.